（12）United States Patent
Bourdillon et al.

(10) Patent No.: US 6,788,555 B2
(45) Date of Patent: Sep. 7, 2004

(54) REGULATION OF BI-DIRECTIONAL FLYBACK CONVERTER

(75) Inventors: Laurence Bourdillon, New Milford, CT (US); Demetri Giannopoulos, Norwalk, CT (US); Nai-Chi Lee, Exeter, RI (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/255,845

(22) Filed: Sep. 26, 2002

(65) Prior Publication Data

US 2004/0062061 A1 Apr. 1, 2004

(51) Int. Cl.$^7$ .............................................. H02M 3/335
(52) U.S. Cl. ................................................. 363/21.14
(58) Field of Search ........................ 363/16, 18, 21.12, 363/21.14, 95, 97, 131

(56) References Cited

U.S. PATENT DOCUMENTS

| | | | | |
|---|---|---|---|---|
| 5,594,629 A | * | 1/1997 | Steigerwald | 363/21.14 |
| 6,069,804 A | | 5/2000 | Ingman et al. | 363/21 |
| 6,229,717 B1 | * | 5/2001 | Corral Blanco et al. | 363/21.14 |
| 6,285,568 B1 | * | 9/2001 | Taurand | 363/21.14 |
| 6,606,257 B2 | * | 8/2003 | Bourdillon | 363/21.12 |

* cited by examiner

*Primary Examiner*—Matthew V. Nguyen
(74) *Attorney, Agent, or Firm*—Aaron Waxler (57) ABSTRACT

A bi-directional flyback circuit includes a primary side switch that regulates the re-circulated energy to achieve substantially zero voltage switching (ZVS) and a secondary-side switch that regulates the output voltage. No feedback circuit between an output side and an input side of the bi-directional flyback circuit is needed for regulating the output voltage. The amount of recirculating energy required to achieve ZVS, and to maintain output regulation is kept substantially at a minimum.

17 Claims, 7 Drawing Sheets

REGULATION OF BI-DIRECTIONAL FLYBACK CONVERTER

FIELD OF THE INVENTION

The present invention related generally to bi-directional flyback converters, and in particular to a regulated bi-directional flyback converter that does not require feedback across an isolation barrier.

BACKGROUND AND SUMMARY

DC—DC bi-directional flyback circuits are electrical circuits that can send power from the input of the circuit to the output of the circuit; and from the output back to the input. DC—DC bidirectional flyback converters are used in a variety of applications. For example, dc—dc bidirectional flyback converters have been generally used in power supplies of 100W or less with often multiple outputs.

DC—DC flyback converters typically include a flyback transformer, which is typically a coupled inductor, having a primary winding, and at least one secondary winding. To control the flow of energy across the flyback transformer a solid-state power switch may be used. In conventional circuits, the power switch is often subjected to 'hard-switching,' which is a condition of high-voltage and high current (high power) across the switch during the switching transition times. When the power switches are hard-switched, there are significant, and undesirable power losses.

Because of the problems associated with hard-switching, it is useful to achieve zero-voltage switching (ZVS). As its name implies, ZVS is switching at a substantially zero voltage level across the switch when the switch is turned on. As such, the power across the switch in the flyback circuit is low, and, desirably, the power losses are also low.

DC—DC bi-directional flyback circuits are useful in universal mains voltage power supplies, which allows a device to operate at a variety of ac voltages. It is often desirable to achieve ZVS on the switch on the primary side of a bi-directional flyback circuit for these applications. Unfortunately, in attempting to achieve ZVS by many known techniques, an excessive amount of energy may be recirculated from the output side to the input side; and/or the desired output voltage may not be maintained due to insufficient re-circulated energy. The recirculation of energy in the circuit results in undesirable losses.

To achieve ZVS on the primary side of the bi-directional flyback circuit, it is known to control the peak negative secondary current (and therefore the amount of re-circulated energy). This known approach regulates the output voltage by controlling the 'on-time' of primary side switch using a feedback loop from the output side of the circuit to the input side of the circuit. The feedback loop often incorporates an opto-coupler.

While feedback loops between the primary and secondary sides of a dc—dc bi-directional flyback converter have use in regulating the output voltage and simultaneously achieving the desired ZVS condition without the drawbacks referenced, they add an additional circuit, and an additional level of complexity to the circuit designer.

What is needed, therefore, is a bi-directional flyback circuit that overcomes at least the shortcomings and drawbacks of the circuits and methods described above.

In accordance with an exemplary embodiment of the present invention, a bi-directional flyback circuit includes a primary side switch that regulates the re-circulated energy to achieve substantially zero voltage switching and a secondary-side switch that regulates the output voltage. No feedback circuit between an output side and an input side of the bi-directional flyback circuit is needed for regulating the output voltage.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Figure 1:
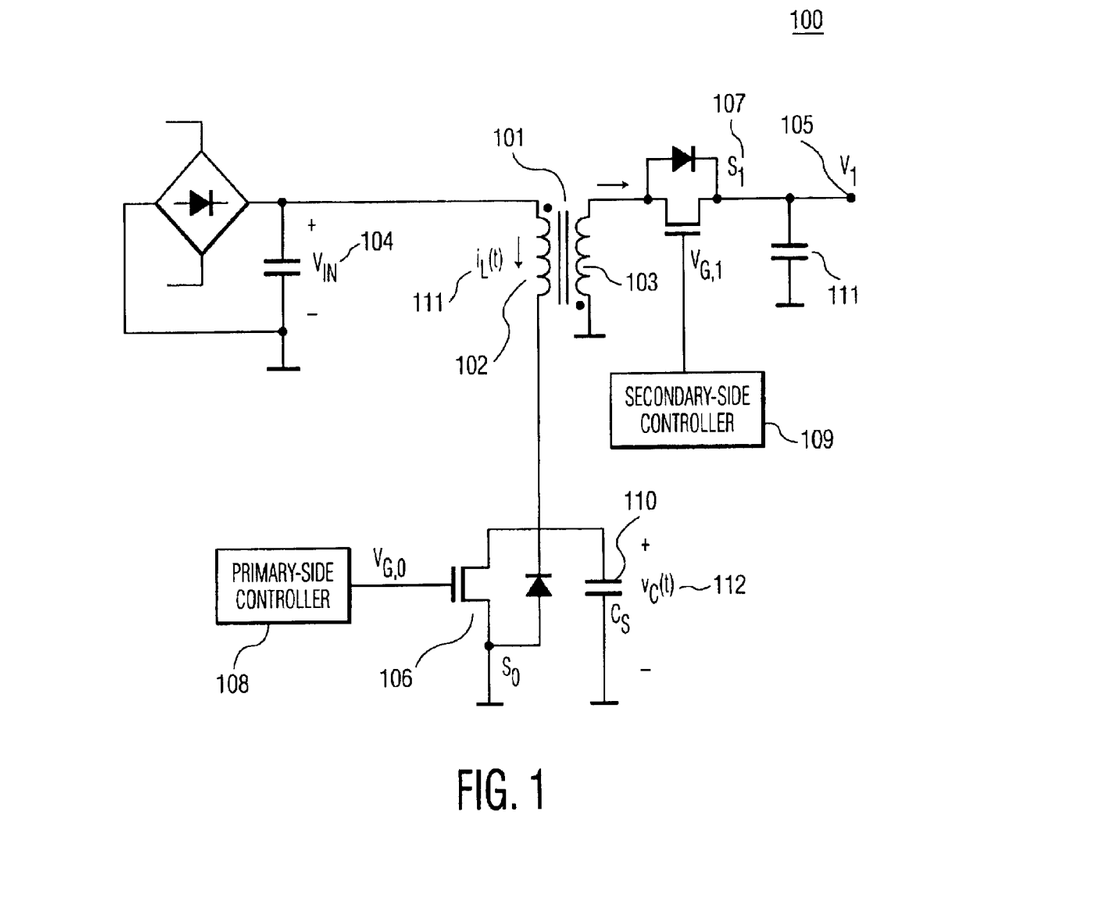
FIG. 1 is a schematic diagram of a dc—dc bi-directional flyback circuit in accordance with an exemplary embodiment of the present invention.

FIG. 1 is a circuit diagram of a dc—dc bi-directional flyback circuit (dc—dc BFC) 100 in accordance with an exemplary embodiment of the present invention. The dc—dc BFC 100 includes an isolation transformer 101, which includes a primary side winding 102, and a secondary side winding 103. An input 104 receives an input voltage ($V_{in}$) on the primary side of the dc—dc BCF 100, and an output 105 delivers an output voltage ($V_1$) is output on the secondary side. The input voltage may be the voltage from a first voltage source and the output voltage may be a voltage from a second voltage source with the dc—dc BFC 100 being a universal mains power supply. It is noted that in this exemplary embodiment, the secondary side capacitor 111 is the output voltage source.

The primary side of the dc—dc BFC 100 includes a primary side switch 106, which may be a field effect transistor (FET) switching circuit known to one of ordinary skill in the art. Likewise, a secondary side switch 107 may be such a switch. Of course, other types of switches may be used in the capacities thereof in the circuit 100. A primary side controller 108, and a secondary side controller 109 may be used to control the re-circulated energy and output voltage, respectively, in ways described in connection with exemplary embodiments of the present invention.

Briefly, the methods and apparati described via exemplary embodiments herein control the circulated energy from the secondary side winding 103 to the primary side winding 102, besides regulating the output voltage. Beneficially, no direct feedback (e.g., opto-coupler) is used from the secondary side to the primary side of the isolation transformer 101. In the control methods and apparati in accordance with exemplary embodiments, the interval of negative secondary current flow through the secondary-side switch 107 is used to regulate the output voltage ($V_1$). The primary-side switch 106 controls the circulated energy from the output to the primary side so that a minimum amount of energy needed to achieve substantially ZVS of the primary switch is circulated (referred to herein as optimal circulated energy).

As described in further detail via exemplary embodiments below, the negative primary side current, $I_{neg,p}$, at turn-off of the secondary side switch 107 is regulated for various scenarios. It is noted that these scenarios include conditions where the reflected output voltage $V_r$ exceeds the input voltage $V_{in}$, and the scenario where $V_{in}$ exceeds Vr. The exemplary embodiments described are for the condition of optimal circulating energy, which is the condition when the circulated energy is just enough to achieve zero-voltage switching of the primary switch. The mathematical expressions set forth below may be used by the primary side controller to determine the on-time of the primary side switch.

To meet this desired end of optimal circulating energy, the primary side switch 106 must deliver enough energy to the transformer 101 so that after the secondary side switch 107 delivers the required energy to the load at the output 105 of the secondary side, there is enough remaining energy to ensure ZVS of the primary switch 106. This is manifest in the energy stored in the secondary winding 103 of the transformer 101. When the secondary switch 107 is turned 'off' during the cycle, the secondary side current (in the secondary winding 103) is reflected to the primary side and discharges a capacitor 110 across the primary side switch 106. In the exemplary embodiment of the present invention where the primary side switch 106 includes a FET, this results in the drain voltage's being substantially zero; and in ZVS when the primary side switch is turned on in the next cycle. As such, in accordance with an exemplary embodiment of the present invention the negative primary side current is controlled to achieve ZVS of the primary side switch 106 eliminating the need for a feedback loop from the output side to the input side of the dc—dc bi-directional flyback circuit 100.

Figure 2:
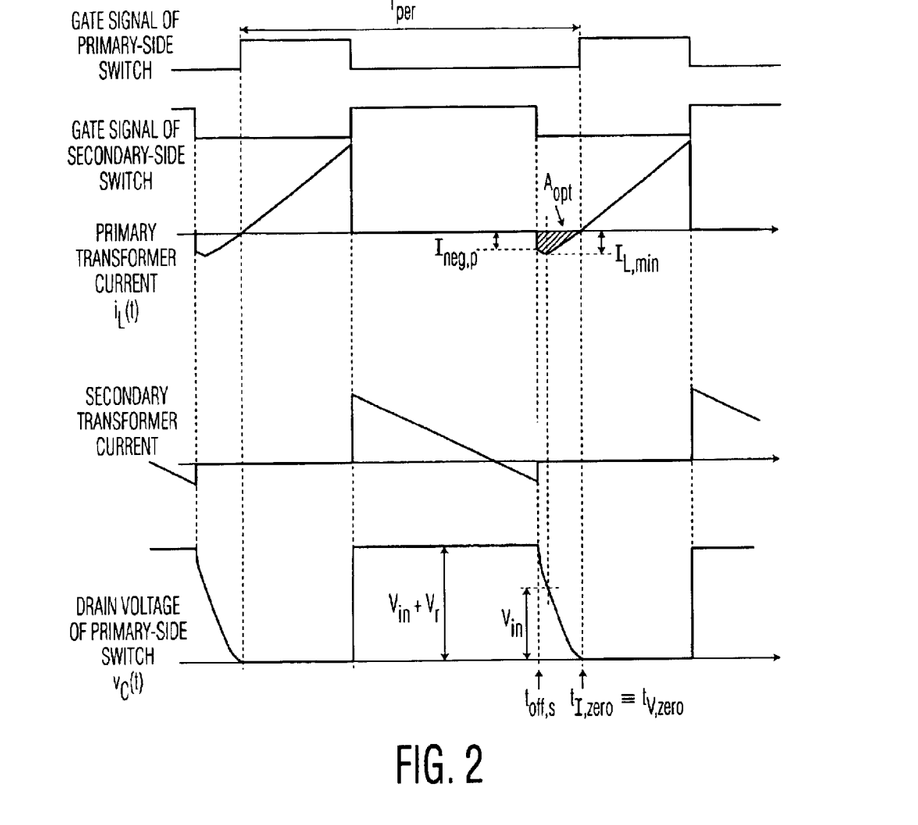
FIG. 2 is a graphical representation of a bi-directional flyback waveform under a substantially optimal circulating energy condition ($t_{I,zero}=t_{v,zero}$) where the input voltage is greater than the reflected voltage ($V_{in}>V_r$) in accordance with an exemplary embodiment of the present invention.
Figure 3:
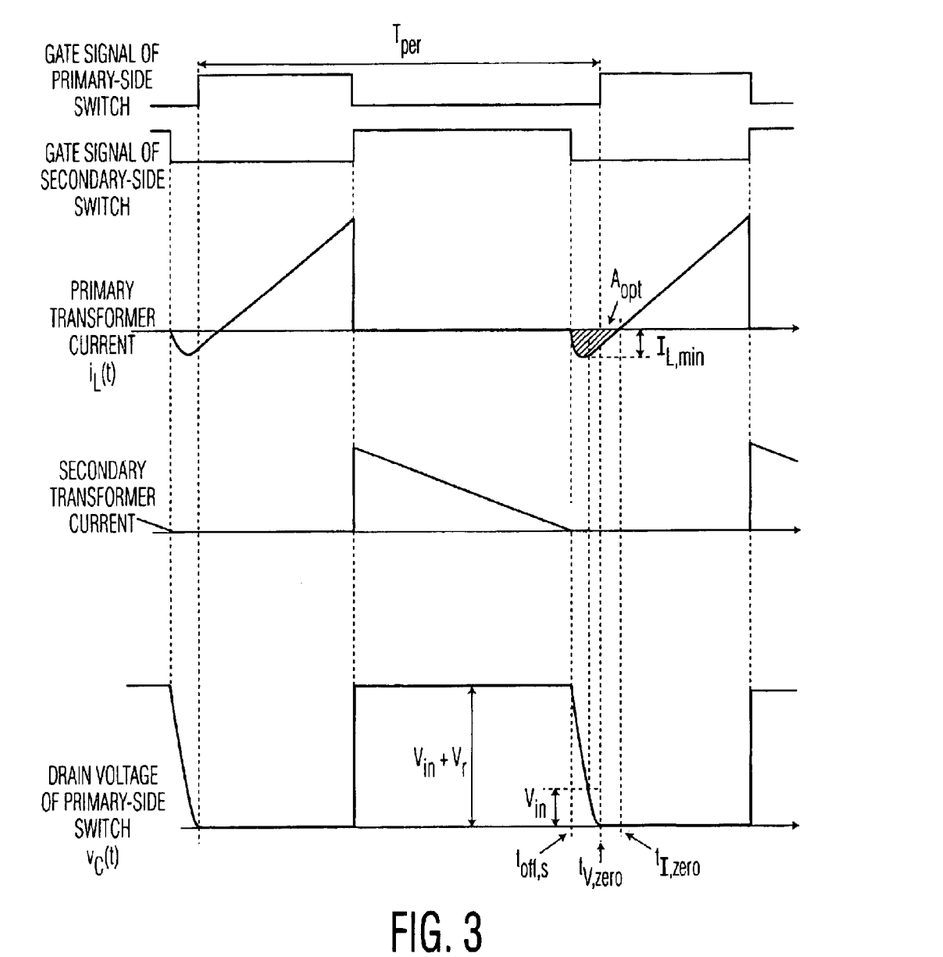
FIG. 3 is a graphical representation of a bi-directional flyback waveform under a substantially optimal circulating energy condition ($I_{neg,p}=0$) where the input voltage is less than the reflected voltage ($V_{in}<V_r$) in accordance with an exemplary embodiment of the present invention.

To more clearly present the exemplary embodiments of the present invention, reference may be herein made to FIGS. 2 and 3. These figures show the waveforms of various elements for a cycle period ($T_{per}$) under a substantially optimal circulating energy condition, where the input voltage is less than the reflected voltage ($V_{in}<V_r$), and where the input voltage is greater than the reflected voltage ($V_{in}>V_r$), respectively.

In accordance with an exemplary embodiment of the present invention, the primary side controller 108 indirectly regulates the re-circulated energy by regulating the area under the negative primary current. This may be achieved by controlling the 'on time' of the primary switch $S_0$ 106. The primary side controller 108 senses the primary current flowing through the sense resistor (not shown) that is in series with the switch $S_0$ 106; the drain voltage Vc(t) 112 of the FET of the primary side switch $S_0$ 106; and the input voltage Vin. Switch $S_0$ 106 is turned on when $V_c(t)$ 112 reaches zero.

As can be appreciated from a detailed description below, the primary side controller 108 directly regulates the area under the negative primary current to a value that is a function of the sensed input voltage Vin 104 and the value of the reflected voltage Vr of the output voltage to the primary side. The value of $V_r$, which is fixed for a given output DC voltage, can be programmed in the primary side controller 108 via the value of a resistor connected to a pin of the controller. In another exemplary embodiment of the present invention, the value of $V_r$ can be derived from the drain voltage of the FET of the switch $S_0$ 106 and the input voltage $V_{in}$ 104.

The secondary side controller 109 regulates the output voltage ($V_1$) by controlling the interval of negative secondary current flow. The secondary side controller 109 senses the output voltage 105 and the secondary current flowing through the sense resistor (not shown) that is in series with the secondary side switch $S_1$ 107. The secondary side controller 109 illustratively includes a secondary side regulation loop that illustratively includes an error amplifier. The error amplifier receives as an input the sensed output voltage and as another input the reference voltage. The secondary side regulation loop will decrease the interval of negative secondary current flow, if the output voltage drops below a reference voltage. The interval of negative secondary current flow will be increased, if the output voltage exceeds the reference voltage. Likewise it will be decreased if the output voltage is less than the reference voltage; and will be unchanged if these are equal.

The bandwidth of the secondary side regulation loop is illustratively significantly higher than the bandwidth of the primary side regulation loop, which is described in detail herein. To this end, the rate of change of the load determines a lower limit for the bandwidth of the secondary side regulation loop. Specifically the secondary side regulation loop bandwidth must me significantly higher than the rate of load change to ensure output voltage regulation under transient conditions. The bandwidth of the primary side loop is chosen much smaller than the secondary side regulation loop so that it does not interfere with the operation of the output regulation loop.

As described, control of the on-time of the primary side switch 106, and thereby the minimum primary negative current to achieve optimal circulated energy is effected by regulating the integral of the primary current. A mathematical expression that describes the area ($A_{opt}$) under the negative primary current curve (versus time, see FIG. 2) for optimal circulated energy to achieve zero-voltage switching when $V_{in} > V_r$, is given by:

$$A_{opt} = \int_{t=t_{off,s}}^{t=t_{l,zero}} i_L(t)dt = -C_S*(V_{in} + V_r) \qquad (1)$$

where, $t_{off,s}$ is the time at which the secondary switch is turned off, and $t=t_{l,zero}$ is the time at which the negative primary side winding current reaches zero.

By contrast, if $V_{in} < V_r$, the area under the negative primary current for zero circulated energy (not needed for soft switching of the primary side switch 106), then $$A_{opt} = \int_{t=t_{off,s}}^{t=t_{l,zero}} i_L(t)dt = -C_S*[0.5*V_{in} + V_r + 0.5*V_r^2/V_{in}] \qquad (2)$$

Figure 5:
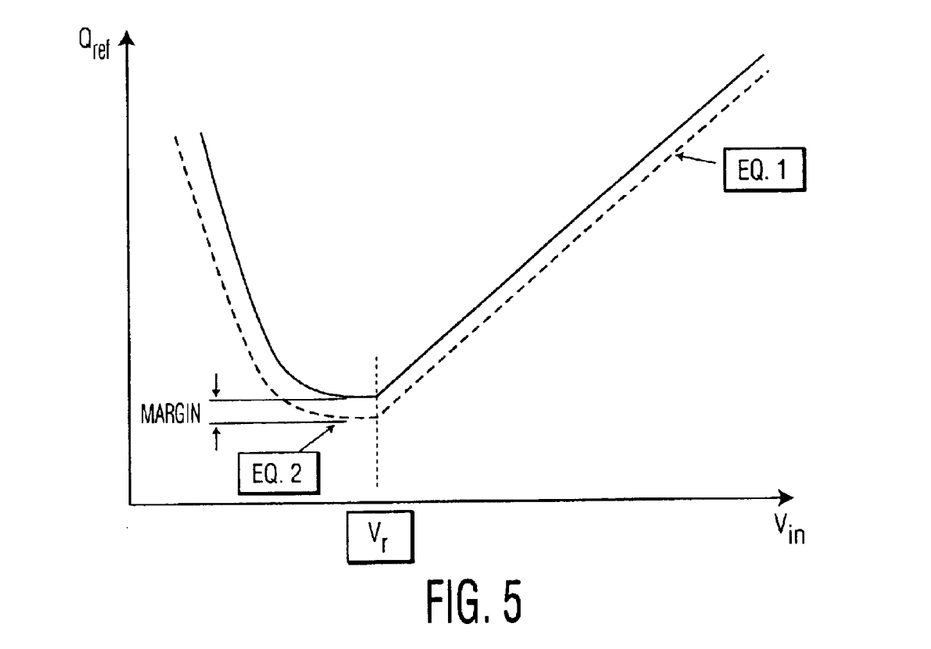
FIG. 5 is a graphical representation of the reference charge as a function of the input voltage resulting in soft-switching of the primary side switch and minimum circulated energy in accordance with an exemplary embodiment of the present invention.

The presently described exemplary embodiment comprises controlling the primary side of the dc—dc BFC 100 by controlling the conduction time of the primary side switch 106. However, the conduction time of the primary side switch 106 is controlled to regulate the integral of the inverted negative primary current. As shown in FIG. 5, the absolute value of this integral is compared to a reference charge, $Q_{ref}$, which is given by the absolute value of the integral of eqns. 1 and 2, plus a margin. This margin is needed to ensure zero-voltage switching of the primary side switch 106 ($S_0$) due to the tolerances of the capacitance 110 $C_s$ and the components used to sense Vin and Vr.

Figure 6:
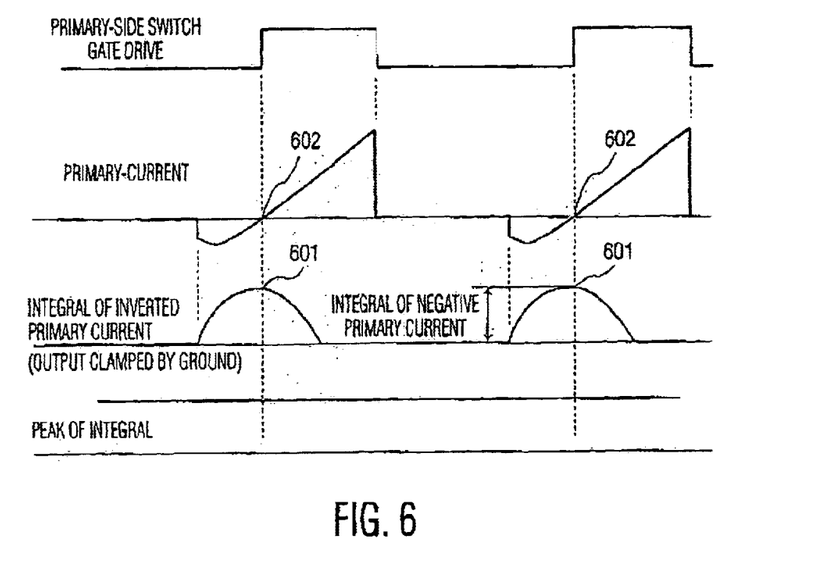
FIG. 6 is a graphical representation showing the waveforms in the primary side control using regulation of the integral under the negative portion of the primary current in accordance with an exemplary embodiment of the present invention.

As can be appreciated, the regulation of the integral of the inverted primary current enables the correct current and energy to be delivered from the primary side to the secondary side of the dc—dc BFC 100 to ensure ZVS. Again the primary side controller 108 effects the required calculations of $A_{opt}$, and the comparison of this to the integral of the inverted primary current during the previous cycle to ensure ZVS in the current cycle. The calculation of the inverted integral of the negative portion of the primary current is illustratively implemented with three functions: inversion, integration and peak detection. The corresponding waveforms are shown in FIG. 6. It is assumed that a circuit implementation of the integrator will limit its output to values above ground. Negative values will be clamped at ground level. The peak of the integrator output waveform is equal to the area of the inverted negative portion of the primary current. It is noted that no critical timing is required in the calculation. Also any ringing present in the negative primary current following the turn-off of the secondary side switch $S_1$ 107 is filtered out.

In the presently described exemplary embodiment, if the integral of the inverted negative primary current is determined to be less than the reference charge, $Q_{ref}$, for a given input voltage $V_{in}$, the conduction time of $S_0$ 106 will be increased. In the opposite case, the conduction time will be decreased. The integral value will be reduced if the secondary side controller 109 increases the power delivered to the load due to reduced circulated energy. The primary-side controller 108 will respond in the next cycle by increasing the conduction time of $S_0$ 106 to increase the circulated energy and, thus to increase the integral value. If the secondary-side controller 107 decreases the power delivered to the load, the integral value will increase. In response, the primary-side controller 108 will decrease the conduction time of $S_0$ 106 to reduce the power delivered to the secondary-side switch 107.

The primary current is sensed as a voltage drop across a sense resistor in series with the primary switch $S_0$ 106. This voltage is then fed to the input of an amplifier (not shown) with gain of −1, which is part of the primary-side controller. The output of the amplifier is connected to the input of an integrator.

As shown in FIG. 6, the output of the integrator increases for the duration of the interval of negative primary current flow. It reaches its peak value 601 (equal to the absolute value of the area under the negative portion of the primary current) when the primary current crosses zero (at 602).

The output of the integrator is reset to zero in each switching cycle by the positive portion of the primary current. A peak detector connected to the output of the integrator will provide the value of the integral of the inverted negative primary current, which the primary feedback loop will regulate. Specifically, the output of the peak detector is fed to the input of an error amplifier, which compares the peak detector output to the reference charge Qref. In turn the output of the error amplifier is connected to the input of a pulse-width modulator that generates the gate drive control signal of the primary-side switch $S_0$.

In accordance with another exemplary embodiment of the present invention, the minimum negative primary side current is regulated to achieve ZVS without the need for a feedback circuit. As referenced above, during its conduction time the primary-side switch ($S_0$) 106 must supply the sum of the energy drawn by the secondary-side load (not shown) and the energy circulated back from the secondary to the primary side to achieve zero-voltage switching of $S_0$ 106. The latter energy is zero, if the reflected output voltage $V_{r,3}$ from the secondary side exceeds the input voltage $V_{in}$ 104.

It is noted that a portion of the stored energy in the transformer during the on-time of the primary switch 106 is delivered to the load and the remainder is returned to the primary side at turn-off of the secondary side switch 107. A primary side regulation loop that regulates the peak negative primary current will set the value of the on-time of the primary switch 106. If the peak negative current is less negative than the values given by the mathematical expressions referenced below then the on-time is increased. Otherwise the on-time is decreased. In an exemplary embodiment of the present invention, the primary side regulation loop includes an error amplifier (not shown) in the primary side controller 108 to effect the change in the on-time of the primary side switch 106. An input of this error amplifier is the integral of the negative current after peak detection. As such, the error amplifier output controls the on-time of the primary side switch 106.

A mathematical expression that describes the minimum primary negative current, $I_{L,min}$, for $V_{in} > V_r$, under optimal circulated energy condition is as follows:

$$I_{L,min} = -V_{in}*(C_S/L_p)^{1/2}, \; V_{in} > V_r \qquad (3)$$

where, $C_s$ is the capacitance of the capacitor 110, and $L_p$ is the inductance of the primary winding 102.

If, however, $V_{in} < V_r$, the minimum primary negative current $I_{L,min}$, for zero circulated energy (to wit, circulated energy is not needed for soft switching (ZVS) of the primary side switch 106) may be given by:

$$I_{L,min} = -V_r*(C_S/L_p)^{1/2}, \; V_{in} < V_r \qquad (4)$$

It is noted that the primary current $i_L(t)$ 111 reaches its minimum negative value when the drain voltage $V_C(t)$ 112 of the primary-side switch becomes equal to $V_{in}$.

In the present exemplary embodiment, a primary-side control method comprises controlling the conduction time of $S_0$ 106 to regulate the minimum negative primary current, $I_{L,min}$. This current is sensed at the source of the FET of the primary-side switch $S_0$ 106. The primary-current $i_L(t)$ is sampled when $v_C(t)=V_{in}$. The sampled value of $i_L(t)$ then is compared to a reference current $I_{ref}$ given by Eqns. 3 and 4 plus a margin 401, shown in FIG. 4.

The primary side controller 106 will sense the primary current as a voltage drop across a sense resistor connected to the source of the switch $S_0$ 106. This voltage drop is fed to a sample-and hold circuit in the primary side controller 108. A comparator in the primary side controller 108 is used to detect the crossing of the input voltage, $V_{in}$, by the falling drain voltage $V_c(t)$ of primary side switch $S_0$ 106. The output of the comparator drives the input of a one-shot circuit in the primary side controller 108. The output of the one-shot circuit drives the control input of the sample-and-hold circuit.

Figure 4:
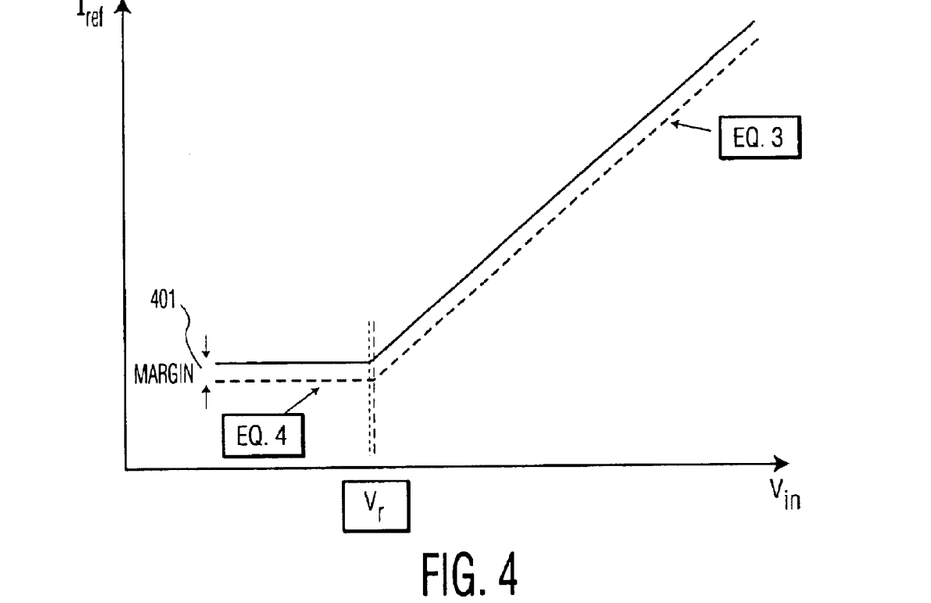
FIG. 4 is a graphical representation of the reference current as a function of input voltage resulting in soft switching of the primary-side switch and minimum circulated energy (regulation of minimum negative current) in accordance with an exemplary embodiment of the present invention.

As can be appreciated, the illustrative method includes control of the energy delivered to the secondary side to achieve optimal circulated energy by regulating the on-time of the primary switch 106. Referring to FIG. 4, if the absolute value Of $I_{L,min}$ is less than $I_{ref}$ the conduction time of $S_0$ is increased. Otherwise it is decreased. The minimum value, $I_{L,min}$, is reduced, if the secondary-side controller 109 reduces the interval of negative secondary current flow to respond to a load increase. The reduction of the negative secondary current flow results in lower re-circulated energy to the primary side winding 102 of the transformer 101. The primary-side control 108 will respond in the next cycle by increasing the conduction time of $S_0$ 106 to increase the circulated energy and, thus to increase the absolute value of $I_{L,min}$. If the secondary-side control increases the interval of negative secondary current flow to respond to a load decrease, the absolute value of $I_{L,min}$ will increase. In the next cycle, the primary-side control will respond and decrease the conduction time of $S_0$ to reduce the power delivered to the secondary-side stage.

In accordance with another exemplary embodiment of the present invention, the integral of the primary switch drain voltage over time is regulated by the primary side controller 108. The primary side controller 108 controls the integral $A_{vopt}$ (shown in FIG. 7) of the primary switch drain voltage between $t_{Vin}$ when it crosses $V_{in}$ and $t_{V,zero}$ when it reaches zero (which coincides with the valley of the drain voltage waveform).

Figure 7:
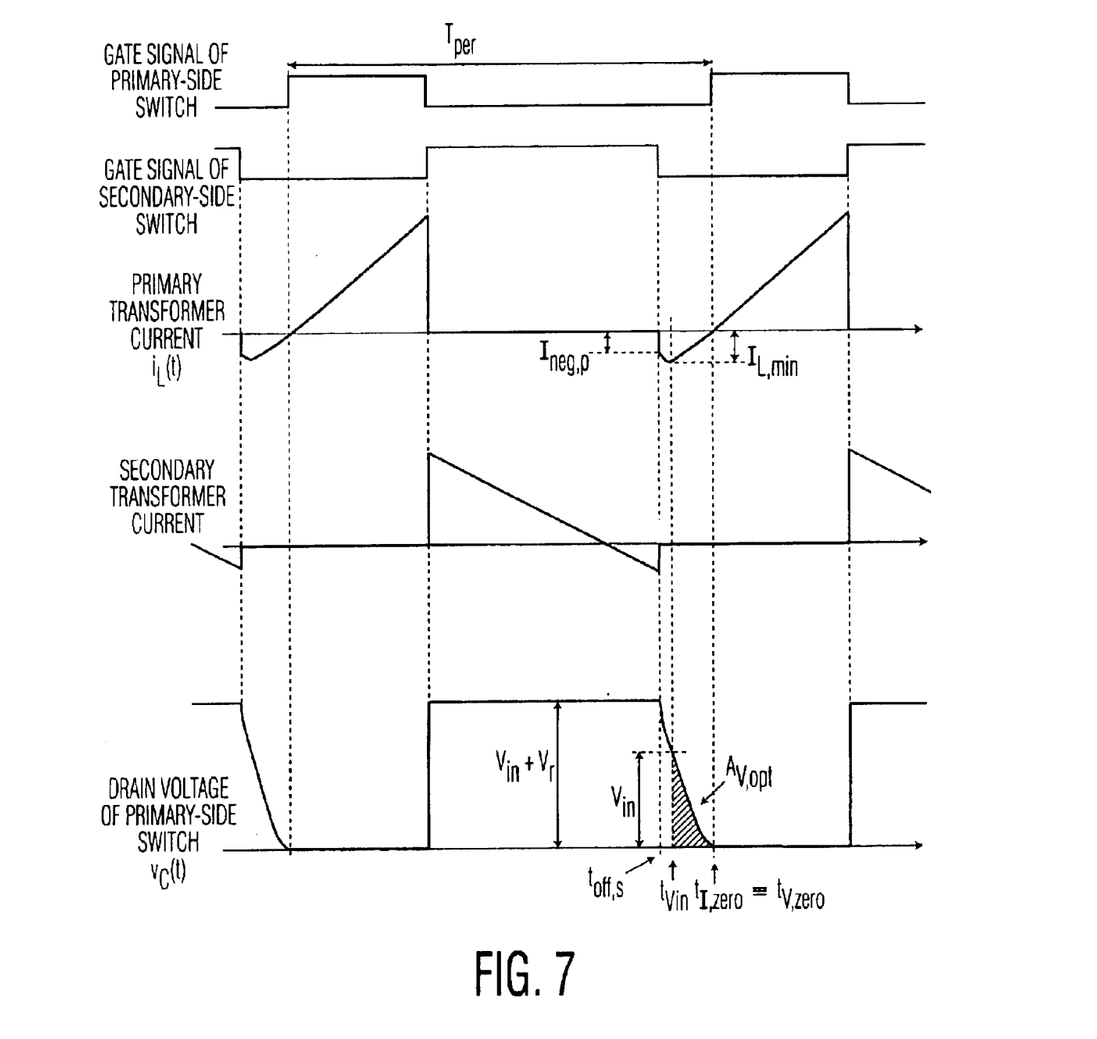
FIG. 7 is a graphical representation showing bi-directional flyback waveforms under optimal circulating conditions ($t_{I,zero}=t_{v,zero}$) where $V_{in}>V_r$ in accordance with an exemplary embodiment of the present invention.
Figure 8:
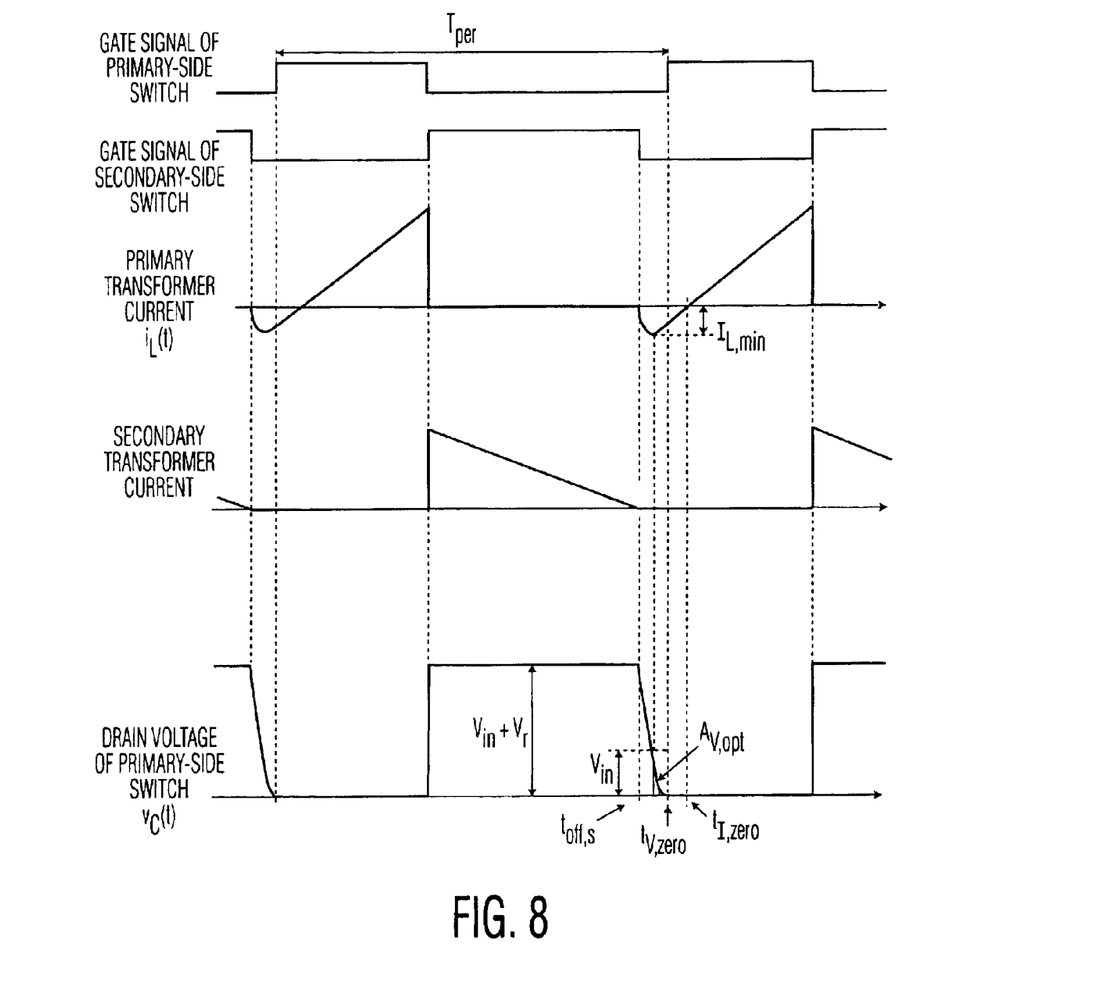
FIG. 8 is a graphical representation showing a bi-directional flyback waveform under optimal circulating conditions ($I_{neg,p}=0$) where $V_{in}<V_r$ in accordance with an exemplary embodiment of the present invention.

The mathematical expression that describes the area $A_{V,opt}$ for optimal circulated energy to achieve zero-voltage switching when $V_{in} > V_r$, is given by:

$$A_{v,opt} = \int_{t=t_{Vin}}^{t=t_{V,zero}} v_C(t) dt = (L_p * C_S)^{1/2} * [(\theta_f - \theta_{in}) - 1] * V_{in} \quad (5)$$

where $\theta_f = \tan^{-1}[-(V_{in}^2 - V_r^2)^{1/2}/V_r]$, $\pi/2 > \theta_f > 0$, and $\theta_{in} = \tan^{-1}[V_r/(V_{in}^2 - V_r^2)^{1/2}]$, $\pi > \theta_{in} > \pi/2$.

Finally, if $V_r \geq V_{in}$ the area $A_{V,opt}$ under the primary switch drain voltage for zero circulated energy (it is not needed for soft switching of the primary switch) is given by:

$$A_{opt} = \int_{t=t_{Vin}}^{t=t_{V,zero}} V_C(t) dt = \quad (6)$$

$$(L_p * C_S)^{1/2} * [\sin^{-1}(V_{in}/V_r) * V_{in} + (V_r^2 - V_{in}^2)^{1/2} - V_r]$$

The invention being thus described, it would be obvious that the same may be varied in many ways by one of ordinary skill in the art having had the benefit of the present disclosure. Such variations are not regarded as a departure from the spirit and scope of the invention, and such modifications as would be obvious to one skilled in the art are intended to be included within the scope of the following claims and their legal equivalents.

What is claimed is:

1. An electronic circuit, comprising:
   a dc—dc bi-directional flyback circuit which has a primary side switch that operates at zero voltage switching without a feedback circuit between an output side and an input side of the dc—dc bi-directional flyback circuit; and
   a primary side controller that regulates an on-time of said primary side switch to substantially achieve a condition optimal circulating energy in said flyback circuit.

2. An electronic circuit as recited in claim 1, wherein a secondary side controller compares an inverted integral of a negative primary current to a reference charge, and performs said regulation based on comparison.

3. An electronic circuit as recited in claim 1, wherein said primary side switch regulates recirculated energy to achieve said substantially zero voltage switching.

4. An electronic circuit as recited in claim 1, wherein a secondary side switch regulates an output voltage.

5. An electronic circuit as recited in claim 1, wherein said primary side controller regulates a minimum negative primary current.

6. An electronic circuit as recited in claim 4, wherein said secondary-side switch uses an interval of negative secondary current flow therethrough to regulate said output voltage.

7. An electronic circuit as recited in claim 1, wherein said primary side controller regulates an integral of a primary switch drain voltage overtime.

8. An electronic circuit as recited in claim 2, wherein said secondary side controller increases a power to a load, end said primary side controller increases a conduction time of said primary side switch in a subsequent cycle.

9. An electronic circuit as recited in claim 2, wherein a secondary side controller decreases a power to a loud, and said primary side controller reduces a conduction time of said primary side switch in a subsequent cycle.

10. An electronic circuit as recited in claim 1, wherein the electronic circuit is a dc—dc bi-directional flyback converter.

11. An electronic circuit as recited in claim 10, wherein said dc—dc bi-directional flyback converter is a universal mains voltage supply.

12. A method of controlling a do-dc bi-directional flyback circuit, comprising: providing a primary side switch;
   controlling said primary side switch to achieve substantially optimal circulating energy in the circuit, without providing feedback from a secondary side to a primary side of the circuit;
   providing a primary side controller that regulates an on-time of said primary side switch to substantially achieve a condition of optimal circulating energy in said flyback circuit.

13. A method as recited in claim 12, wherein said primary side switch regulates recirculated energy to achieve said substantially zero voltage switching.

14. A method as recited in claim 12, further comprising:
providing a secondary side switch that regulates an output voltage.

15. A method as recited in claim 12, wherein said primary side controller regulates a minimum negative primary current.

16. A method as recited in claim 12, wherein said primary side controller regulates an integral of a primary switch drain voltage over time.

17. A method as recited in claim 12, a secondary side controller compares an inverted integral of a negative primary current to a reference charge, and performs said regulation based on comparison.

* * * * *